Nov. 12, 1929.     G. S. KECK     1,735,437
DIRIGIBLE HEADLIGHT FOR AUTOMOBILES
Filed Feb. 23, 1927     2 Sheets-Sheet 1
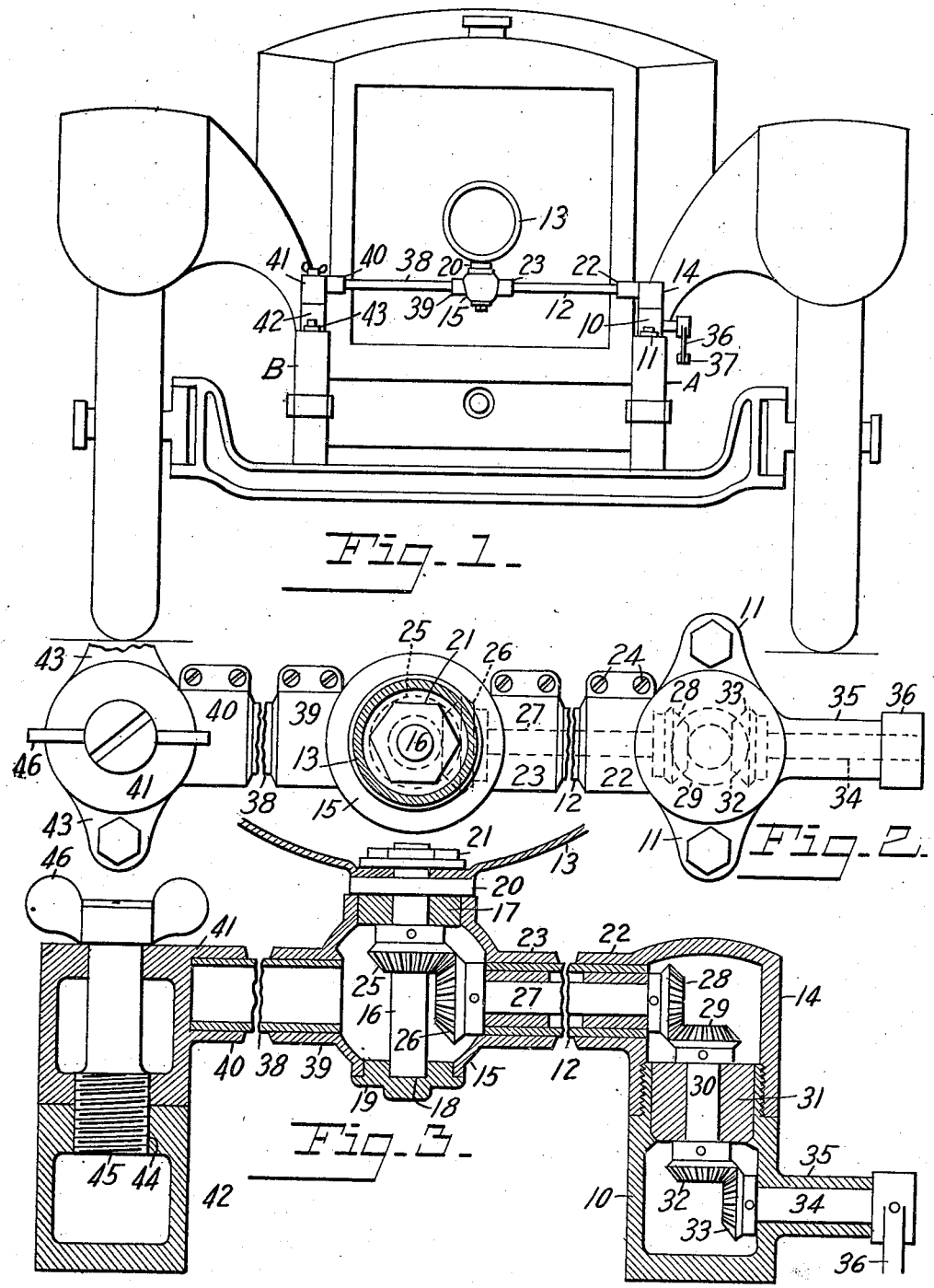

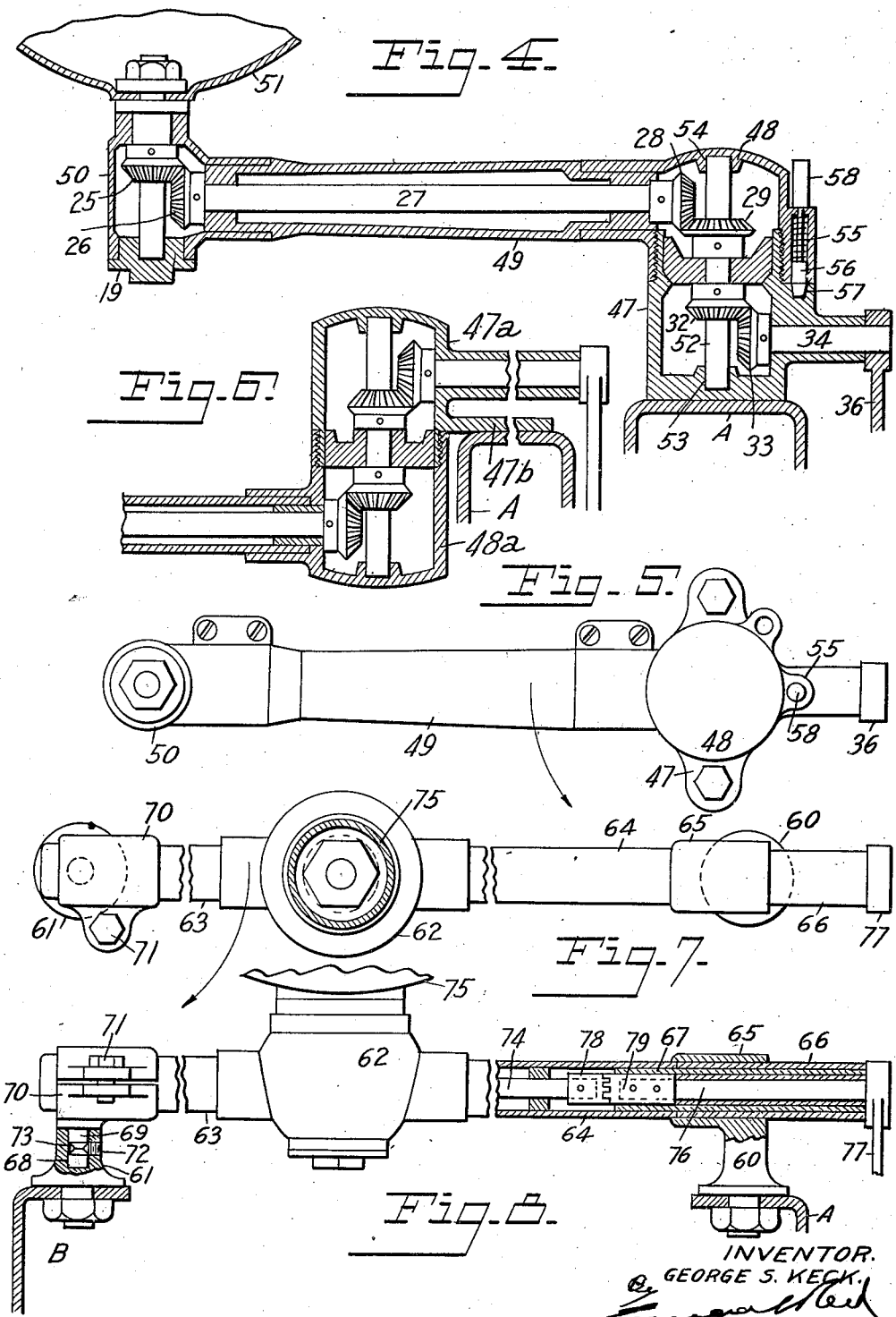

Patented Nov. 12, 1929

1,735,437

UNITED STATES PATENT OFFICE

GEORGE S. KECK, OF PASADENA, CALIFORNIA, ASSIGNOR TO PILOT RAY CORPORATION, OF WILMINGTON, DELAWARE, A CORPORATION OF DELAWARE

DIRIGIBLE HEADLIGHT FOR AUTOMOBILES

Application filed February 23, 1927. Serial No. 170,085.

This invention relates to dirigible headlights for automobiles and more particularly to means for mounting and operating a single headlight in front of the radiator.

One object of the invention is to provide a supporting and operating mechanism for the headlight which will be compact in its arrangement, of a neat attractive appearance, and in which the operating mechanism will be contained within the supporting structure.

A further object of the invention is to provide supporting and operating mechanism for a headlight of such a character that the headlight can be moved to a position in which it will not interfere with the hand cranking of the automobile.

A further object of the invention is to provide such a mechanism which will be simple in its construction and operation, which can be produced at a relatively low cost and which can be easily installed upon an automobile.

Other objects of the invention will appear as the device is described in detail.

In the accompanying drawings Fig. 1 is a front elevation of an automobile showing my invention mounted thereon; Fig. 2 is a top plan view of the mounting for the headlight, partly broken away, and with the headlight casing in section; Fig. 3 is a vertical sectional view taken centrally through such a mechanism and partly broken away; Fig. 4 is a vertical sectional view of a supporting mechanism for the headlight comprising a single arm; Fig. 5 is a plan view of the device shown in Fig. 4; Fig. 6 is a sectional view of a portion of a headlight supporting structure shown in inverted position; Fig. 7 is a plan view, partly broken away, of a modified form of mounting and operating mechanism; and Fig. 8 is a front elevation, partly in section, of the device of Fig. 7.

In carrying out my invention I mount on the frame of the automobile, in front of the radiator, a supporting structure consisting of a hollow transverse arm or bar supported at one or both ends on the frame and having the actuating mechanism for the headlight arranged within the same. A part of this supporting structure is pivotally mounted so that the headlight can be moved away from the radiator into a position in which it will not interfere with the hand cranking of the automobile. The supporting structure and the operating mechanism may take various forms and I have, in the present drawings, shown a preferred form together with certain modifications thereof.

In that form of the apparatus shown in Figs. 1, 2 and 3, the supporting structure comprises a hollow supporting member or base 10 having means, such as apertured lugs 11, for mounting the same on one of the frame members, A, of an automobile just in front of the radiator. Mounted on this supporting member is a transversely extending arm 12 which supports the headlight 13. The arm may be mounted on the supporting member in various ways but, in the present instance, it has at its outer end a hollow head 14, the lower end of which is open and is secured to the upper end of the supporting member 10, preferably by threading the same thereon. The threaded connection between the supporting member 10 and the head 14 permits of the pivotal movement of the arm 12 with relation to the supporting member and in an installation where the pivotal movement is not desired the base 10 and head 14 may be made in one piece. Secured to the inner end of the arm 12 is a lamp supporting housing or head 15 on which the lamp 13 is mounted for movement about a vertical axis. As here shown, a vertical shaft 16 is mounted within the head 15 and is journaled near its upper end in a bearing 17 and at its lower end in a bearing 18 which, in the present arrangement, is formed in a cap 19 which closes an opening in the lower end of the head. A washer 20 rests upon the upper end of the head and the casing 13 of the headlight rests upon this washer, the shaft 16 extending through the washer and through an opening in the lower portion of the casing, a nut 21 on the upper end of the bolt serving to secure the lamp casing to the shaft without interfering with its movement relatively thereto. The arm 12 may be connected with the heads 14 and 15 in any suitable manner. As here shown, it is mounted in laterally extending bosses 22 and 23 carried by respective heads and these bosses are preferably split lengthwise so that they may be clamped tightly about the ends of the arm by means of screws 24, as shown in Fig. 2. Rigidly secured to the shaft 16, within the hollow lamp supporting head 15, is a beveled gear 25 which meshes with a beveled gear 26 on a shaft 27 which is journaled in the tubular arm 12 and extends beyond the outer end of that arm into the hollow head 14 where it is provided with a beveled gear 28 which meshes with a beveled gear 29 on a shaft 30. The shaft 30 is journaled in a bearing 31 mounted in the upper portion of the base and has secured to its lower end, below the bearing, a beveled gear 32 which meshes with a beveled gear 33 on a shaft 34 which is journaled in a sleeve or elongated bearing 35 which, in the present instance, is formed integral with the supporting member 10. The shaft 34 is provided at its outer end with means for operatively connecting the same with the steering mechanism of the automobile. This connecting means may take various forms but, in the present construction, it comprises a crank arm 36 rigidly secured to the end of the shaft 34 and connected by means of a connecting rod 37 with a suitable part of the steering mechanism, such as the crank arm which swings lengthwise of the automobile to transmit movement from the steering mechanism to the front wheels of the automobile. Such connecting devices are well known and need not be here shown or described in detail.

The lamp may be carried solely by a supporting structure comprising the parts above described but unless the structure is quite heavy and rigid the headlight will be subject to more or less vibration and I have therefore provided means for rigidly bracing the headlight against the other frame member. As here shown, an arm 38 is clamped at one end in a boss 39 carried by the lamp supporting head 15 and is clamped at its other end in a boss 40 carried by a connecting member or head 41. This connecting member or head 41 rests upon a supporting member or base 42, which has means for rigidly securing it to the frame member B of the automobile, such as the apertured lugs 43. The arm 38 being rigidly connected with the lamp supporting head 15 is therefore rigid with the arm 12, the two parts forming in effect a single rigid arm. When the head 41 is rigidly secured to the supporting member or base 42 the lamp and its supporting structure will be held rigidly against movement and the lamp will be subject to little or no vibration with relation to the automobile frame. The head 41 may be secured to the boss 42 in any suitable manner but, in the present instance, the base has in its upper end a screw threaded opening 44 to receive a screw threaded stud 45 mounted in the head 41 and extending beyond the upper side thereof where it is provided with a thumb nut 46 by means of which it may be rotated. When it is desired to move the headlight away from the radiator, which is necessary only at infrequent intervals, the stud 45 is withdrawn from the opening 44 in the base, thereby releasing the head 41 and permitting the arms 12 and 38 and the lamp 13 to be swung about their point of connection with the base 10. Because of the particular arrangement of the actuating mechanism here shown this pivotal movement of the supporting structure does not disconnect any part of the actuating mechanism or otherwise interfere therewith. The structure as a whole is very compact, of an attractive appearance and the operating mechanism, being contained within the supporting structure, is entirely concealed. The connecting device 36 lies under the fender and is therefore visible from the front of the machine only and even from that point is not conspicuous.

In Figs. 4 and 5 I have shown an installation in which the supporting structure comprises a single pivoted arm. This form of the device differs but little in construction and operation from the corresponding parts of the mechanism above described. It merely omits the brace arm 38 and its associated parts. As shown in those figures the supporting member or base 47 is mounted on the frame member A and has pivotally mounted on the upper end thereof a head or connecting member 48 to which is secured a laterally extending arm 49. At the inner end of the arm 49 is mounted a lamp supporting head 50 on which the casing 51 of the headlight is mounted. The actuating mechanism which is mounted within the supporting structure is substantially identical with that above described, with the exception that the vertical shaft 52 in the supporting member 47 is seated at its lower end in a bearing 53 in the bottom of the base 47 and at its upper end in a bearing 54 in the top wall of the connecting member. Suitable locking means are provided for holding the arm and lamp normally against pivotal movement with relation to the base 47 and, as here shown, the head 48 has a guideway 55 in which is slidably mounted a spring pressed plunger 56, the lower end of which is adapted to enter a socket 57 in the base 47 to lock these two parts against relative movement. The upper end of the plunger extends above the guideway 55 to provide a finger piece 58 by means of which it may be manipulated.

If it is desired to support the headlight at a lower level this may be accomplished by inverting the supporting structure. In Fig. 6 I have shown the supporting member 47$^a$ as inverted so that its open end extends downwardly, and have provided the same with a bracket 47$^b$ by means of which it may be mounted on the frame member A. The connecting member 48ᵃ is screwed onto the open end of the supporting member so that it extends downwardly alongside of the frame member. The operating mechanism is identical with that above described, in connection with Figs. 4 and 5 but the transverse supporting member is arranged at a lower level.

In Figs. 7 and 8, I have shown a modified form of the mounting and operating mechanism. As there shown, the supporting structure comprises a member or base 60 mounted on the frame member A of the automobile and a supporting member or base 61 is mounted on the frame member B of the automobile. The lamp supporting head 62, which is similar in construction and arrangement to that shown in Fig. 3, is carried by a supporting bar or arm consisting of parts 63 and 64 arranged on the opposite sides of and rigidly secured to the head 62. This arm is supported at its respective ends by the supporting member 60 and 61 and is pivotally connected with one of said supporting members and is longitudinally movable to connect the same with and disconnect the same from the other member. As here shown, the supporting member 60 has at its upper end a horizontal boss or integral sleeve 65 in which is mounted a tubular rod or casing 66 of a diameter substantially equal to the diameter of the arm 64. The outer end of the casing 66 projects some distance beyond the supporting member 60 while the inner end thereof terminates a short distance within the other end of the hollow boss 65. Arranged within the casing 66 is a sleeve 67, the outer end of which is substantially coincident with the outer end of the hollow casing 66 and the inner end of which projects some distance beyond the inner end of the hollow boss 65 and is adapted to extend into the adjacent end of the arm 64. This arm is mounted for longitudinal movement so that it may be moved onto and off of the end of the sleeve 67 to establish the connection between the arm and the supporting member 60. Preferably the outer end of the arm extends into the hollow boss 65 which provides an additional support therefor and conceals the joint. The part 63 of the arm may be mounted on the supporting member 61 in any suitable manner which will permit of its being moved lengthwise to establish and interrupt the connection between the part 64 thereof and the supporting member 60. Obviously the supporting arm may be mounted to swing about either a horizontal or a vertical axis, as it makes but little difference which way the supporting structure is moved so long as it is moved to a position which will not interfere with the cranking of the automobile. In the present instance, the arm is mounted for movement about a vertical axis and to this end the supporting member 61 has in its upper end a socket 68 in which is rotatably mounted a stud 69 depending from a split sleeve 70 which is clamped about the end of the part 63 of the arm by means of a screw 71. The stud or pivot pin 69 is preferably retained in the socket by means of a set screw 72 and, if desired, it may be provided with a circumferential groove 73 to receive the end of the set screw, whereby the latter will retain the stud within the socket without interfering with its rotation. It will be apparent that by loosening the screw 71 the tubular supporting arm may be moved lengthwise to disengage the same from the end of the sleeve 67, thereby leaving the same free for pivotal movement about its connection with the supporting member 61. When the lamp is restored to its normal position the end of the arm 64 is again moved over the end of the sleeve 67 and the screw tightened down to rigidly secure the same in position.

Mounted in suitable bearings in the part 64 of the supporting arm is a shaft 74 which is connected with the headlight 75 in the manner shown in Fig. 3. This shaft is detachably connected at its outer end with the inner end of a shaft 76 journaled in a suitable bearing in the sleeve 67 and provided at its outer end with means, such as the crank arm 77, for connecting the same with the steering mechanism of the automobile. The connected ends of the two shafts are arranged adjacent to the inner end of the sleeve 67 and the connection is of such a character that when longitudinal movement is imparted to the supporting arm 64 to withdraw it from the end of the sleeve the two shafts will be disconnected. The connection may be of any suitable kind which will permit this separation but, as here shown, it consists of clutch like members 78 and 79 rigidly secured to the adjacent ends of the respective shafts and having axial teeth so arranged that they will be moved into and out of interlocking engagement by the longitudinal movement of the supporting arm.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. In a dirigible headlight mechanism, supporting members having means for mounting the same on the respective side members of an automobile frame, a tubular arm to extend transversely to said frame and having an enlarged portion intermediate of the ends thereof, means for pivotally connecting one end of said arm with one of said supporting members, means for separably connecting the other end of said arm with the other of said supporting members, a vertical shaft journaled in the enlarged portion of said arm, a headlight secured to said shaft, a shaft journaled in said tubular arm, gears connecting said shafts, a shaft rotatably mounted on one of said supporting members, means for connecting the last mentioned shaft with the shaft which is mounted in said tubular arm, and means for actuating said last mentioned shaft.

2. In a dirigible headlight mechanism, a hollow supporting member having means for mounting the same upon the frame of an automobile, a tubular arm pivotally mounted on said supporting member and extending laterally therefrom, a headlight mounted on said arm for movement about a vertical axis, a shaft journaled in said tubular arm, means for operatively connecting said shaft to said headlight, a shaft journaled in said hollow supporting member, means for operatively connecting said shafts one to the other, and means for imparting operative movement to said shafts.

3. In a dirigible headlight mechanism, a hollow supporting member having means for mounting the same upon the frame of an automobile, a tubular arm pivotally mounted on said supporting member and extending laterally therefrom, a headlight mounted on said arm for movement about a vertical axis, a shaft journaled in said tubular arm, means for operatively connecting said shaft to said headlight, a shaft journaled in said hollow supporting member, means for operatively connecting said shafts one to the other, means for imparting operative movement to said shafts, and means for holding said arm normally against pivotal movement with relation to said supporting member.

4. In a dirigible headlight mechanism, a hollow supporting member having means for securing the same to the frame of an automobile, a tubular arm to extend transversely to said frame and having at one end a head which is rotatably mounted on said supporting member, and having at its other end a housing, a vertical shaft journaled in said housing, a headlight secured to said shaft, a shaft journaled in said arm, gears connecting said shafts one with the other, a shaft journaled in said hollow supporting member, gears connecting the shaft in said supporting member with the shaft in said hollow arm, a shaft carried by said supporting member extending beyond the outer wall thereof, gears connecting the last mentioned shaft with the shaft in said supporting member, and an actuating device connected with the outer end of said last mentioned shaft.

5. In a dirigible headlight mechanism, a hollow supporting member having means for securing the same to an automobile frame, a hollow member screw threaded onto said supporting member and having a boss extending laterally therefrom, a tubular arm mounted in said boss, means for clamping said arm in said boss, a hollow head having a tubular boss to receive the other end of said arm, means for clamping said arm in the last mentioned boss, a vertical shaft mounted on said hollow head, a headlight secured to said shaft, a shaft journaled in said tubular arm, a shaft journaled in said hollow supporting member, a shaft mounted on said hollow supporting member and extending to the exterior thereof, gears for connecting the several shafts one with the other, and an actuating member connected with the last mentioned shaft.

6. In a dirigible headlight mechanism, a supporting member having means for mounting the same on one of the side members of an automobile frame and having a screw threaded upper portion, an arm to extend transversely to said automobile frame and having at one end a part mounted on the screw threaded portion of said supporting member, a second supporting member having means for mounting the same on the other side member of said automobile frame, said arm having at its other end a part to engage the last mentioned supporting member, a locking member carried by the last mentioned part of said arm to detachably connect the same with said last mentioned supporting member, a headlight mounted on said arm between the ends thereof for movement about a vertical axis with relation thereto, an actuating device for said headlight, and means for operatively connecting said actuating device with the steering mechanism of said automobile.

In testimony whereof, I affix my signature hereto.

GEORGE S. KECK.